US011726908B2

(12) United States Patent
Limaye et al.

(10) Patent No.: US 11,726,908 B2
(45) Date of Patent: Aug. 15, 2023

(54) GARBAGE COLLECTION IN A MEMORY SUB-SYSTEM DURING A LOW BATTERY STATE

(71) Applicant: Micron Technology, Inc., Boise, ID (US)

(72) Inventors: Aparna U. Limaye, Boise, ID (US); Tracy D. Evans, Boise, ID (US); Tomoko Ogura Iwasaki, San Jose, CA (US); Avani F. Trivedi, Eagle, ID (US); Jianmin Huang, San Carlos, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/672,872

(22) Filed: Feb. 16, 2022

(65) Prior Publication Data

US 2022/0171705 A1 Jun. 2, 2022

Related U.S. Application Data

(63) Continuation of application No. 16/995,356, filed on Aug. 17, 2020, now Pat. No. 11,281,578.

(Continued)

(51) Int. Cl.
*G06F 12/02* (2006.01)
*G06F 12/0882* (2016.01)
(Continued)

(52) U.S. Cl.
CPC ........ *G06F 12/0253* (2013.01); *G06F 1/3212* (2013.01); *G06F 11/076* (2013.01);
(Continued)

(58) Field of Classification Search
CPC ............ G06F 12/0246; G06F 12/0253; G06F 1/3213; G06F 11/076; G06F 11/3037; G06F 12/0833; G06F 12/0882
(Continued)

(56) References Cited

U.S. PATENT DOCUMENTS 5,127,014 A 6/1992 Raynham
7,688,614 B2 3/2010 Morimoto
(Continued)

FOREIGN PATENT DOCUMENTS

JP 2010244342 A 10/2010
KR 20090053901 A 5/2009
(Continued)

OTHER PUBLICATIONS

International Search Report and Written Opinion for International Application No. PCT/US2020/047074 dated Nov. 20, 2020, 9 pages.
(Continued)

*Primary Examiner* — Hua J Song
(74) *Attorney, Agent, or Firm* — Lowenstein Sandler LLP

(57) ABSTRACT

Systems, apparatuses, and methods related to media management, including "garbage collection," in memory or storage systems or sub-systems, such as solid state drives, are described. For example, a battery state associated with the memory system or sub-system may be used as an indicator or basis for managing a garbage collection operation on a data block. A controller or the system or sub-system may determine that a battery state or condition satisfies a criterion. Based on determining that the criterion is satisfied the, the garbage collection operation may be postponed until the battery state changes to satisfy a different battery condition.

18 Claims, 5 Drawing Sheets

Related U.S. Application Data

(60) Provisional application No. 62/889,283, filed on Aug. 20, 2019.

(51) Int. Cl.
  *G06F 1/3212* (2019.01)
  *G06F 11/30* (2006.01)
  *G06F 11/07* (2006.01)
  *G06F 12/0831* (2016.01)

(52) U.S. Cl.
  CPC ...... *G06F 11/3037* (2013.01); *G06F 12/0246* (2013.01); *G06F 12/0833* (2013.01); *G06F 12/0882* (2013.01)

(58) Field of Classification Search
  USPC ........................................................ 711/154
  See application file for complete search history.

(56) References Cited

U.S. PATENT DOCUMENTS

| | | |
|---|---|---|
| 9,514,057 B2 | 12/2016 | Marcu et al. |
| 10,761,728 B2 | 9/2020 | Hong et al. |
| 10,853,243 B2 | 12/2020 | Davis |
| 11,282,567 B2 | 3/2022 | Iwasaki |
| 2005/0144357 A1 | 6/2005 | Sinclair |
| 2005/0144365 A1 | 6/2005 | Gorobets et al. |
| 2005/0144516 A1 | 6/2005 | Gonzalez et al. |
| 2006/0136687 A1 | 6/2006 | Conley et al. |
| 2007/0174579 A1 | 7/2007 | Shin |
| 2007/0237003 A1 | 10/2007 | Melik-Martirosian et al. |
| 2008/0229000 A1 | 9/2008 | Kim |
| 2009/0073771 A1 | 3/2009 | Li |
| 2009/0319720 A1 | 12/2009 | Stefanus et al. |
| 2013/0046920 A1 | 2/2013 | Ryu et al. |
| 2013/0055047 A1 | 2/2013 | Sharon et al. |
| 2013/0339572 A1 | 12/2013 | Fanning et al. |
| 2014/0032817 A1 | 1/2014 | Bux et al. |
| 2014/0101372 A1 | 4/2014 | Jung |
| 2014/0204672 A1 | 7/2014 | Lee et al. |
| 2015/0154118 A1 | 6/2015 | Marcu et al. |
| 2015/0205539 A1 | 7/2015 | Moon et al. |
| 2016/0011971 A1 | 1/2016 | Lee et al. |
| 2016/0026526 A1 | 1/2016 | Zhang et al. |
| 2016/0092128 A1 | 3/2016 | Jain et al. |
| 2016/0179386 A1 | 6/2016 | Zhang |
| 2017/0046256 A1 | 2/2017 | Horspool et al. |
| 2017/0242625 A1* | 8/2017 | Pandurangan ........ G06F 3/0659 |
| 2017/0249969 A1* | 8/2017 | Aiello ................... G06F 3/0659 |
| 2018/0024779 A1 | 1/2018 | Kojima |
| 2018/0059934 A1 | 3/2018 | Lee et al. |
| 2018/0189175 A1 | 7/2018 | Ji et al. |
| 2018/0314579 A1 | 11/2018 | Sampayo et al. |
| 2019/0095323 A1 | 3/2019 | Gidra et al. |
| 2019/0163622 A1 | 5/2019 | Wu et al. |
| 2019/0179569 A1 | 6/2019 | Yang |
| 2019/0303253 A1 | 10/2019 | Shin et al. |
| 2020/0042438 A1 | 2/2020 | Yi |
| 2020/0073571 A1 | 3/2020 | Chen et al. |
| 2020/0073573 A1 | 3/2020 | Park |
| 2020/0089608 A1 | 3/2020 | Chou et al. |
| 2020/0110537 A1 | 4/2020 | Hahn et al. |
| 2020/0110706 A1 | 4/2020 | Takeuchi et al. |
| 2020/0117559 A1 | 4/2020 | Park |
| 2020/0133572 A1 | 4/2020 | Park |
| 2020/0174700 A1 | 6/2020 | Seong |
| 2020/0409559 A1 | 12/2020 | Sharon et al. |
| 2021/0034273 A1 | 2/2021 | Perneti et al. |
| 2021/0042201 A1 | 2/2021 | Byun |
| 2022/0083223 A1 | 3/2022 | Choi et al. |
| 2022/0188234 A1 | 6/2022 | Na |

FOREIGN PATENT DOCUMENTS

| | | |
|---|---|---|
| KR | 20100122720 A | 11/2010 |
| KR | 20140116617 A | 10/2014 |

OTHER PUBLICATIONS

International Search Report and Written Opinion for International Application No. PCT/US2020/047263 dated Nov. 20, 2020, 11 pages.

International Search Report and Written Opinion for International Application No. PCT/US2020/047075, dated Nov. 20, 2020, 10 pages.

International Search Report and Written Opinion for International Application No. PCT/US2020/048393, dated Nov. 25, 2020, 10 pages.

International Search Report and Written Opinion for International Application No. PCT/US2020/047260, dated Nov. 25, 2020, 10 pages.

Shiqin Yan et al., Tiny-Tail Flash: Near perfect elimination of garbage collection tai latencies in NAND SSDs, Feb. 27, 2017, FAST '17 (Year: 2017).

* cited by examiner

GARBAGE COLLECTION IN A MEMORY SUB-SYSTEM DURING A LOW BATTERY STATE

RELATED APPLICATION

This application is a continuation of U.S. patent application Ser. No. 16/995,356, filed Aug. 17, 2020, which claims the benefit of U.S. Provisional Application No. 62/889,283, filed Aug. 20, 2019, the entire contents of each of which are hereby incorporated by reference herein.

TECHNICAL FIELD

Embodiments of the disclosure relate generally to memory sub-systems, and more specifically, relate to garbage collection in a memory sub-system during a low battery state.

BACKGROUND

A memory sub-system can be a storage system, such as a solid-state drive (SSD), or a hard disk drive (HDD). A memory sub-system can be a memory module, such as a dual in-line memory module (DIMM), a small outline DIMM (SO-DIMM), or a non-volatile dual in-line memory module (NVDIMM). A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
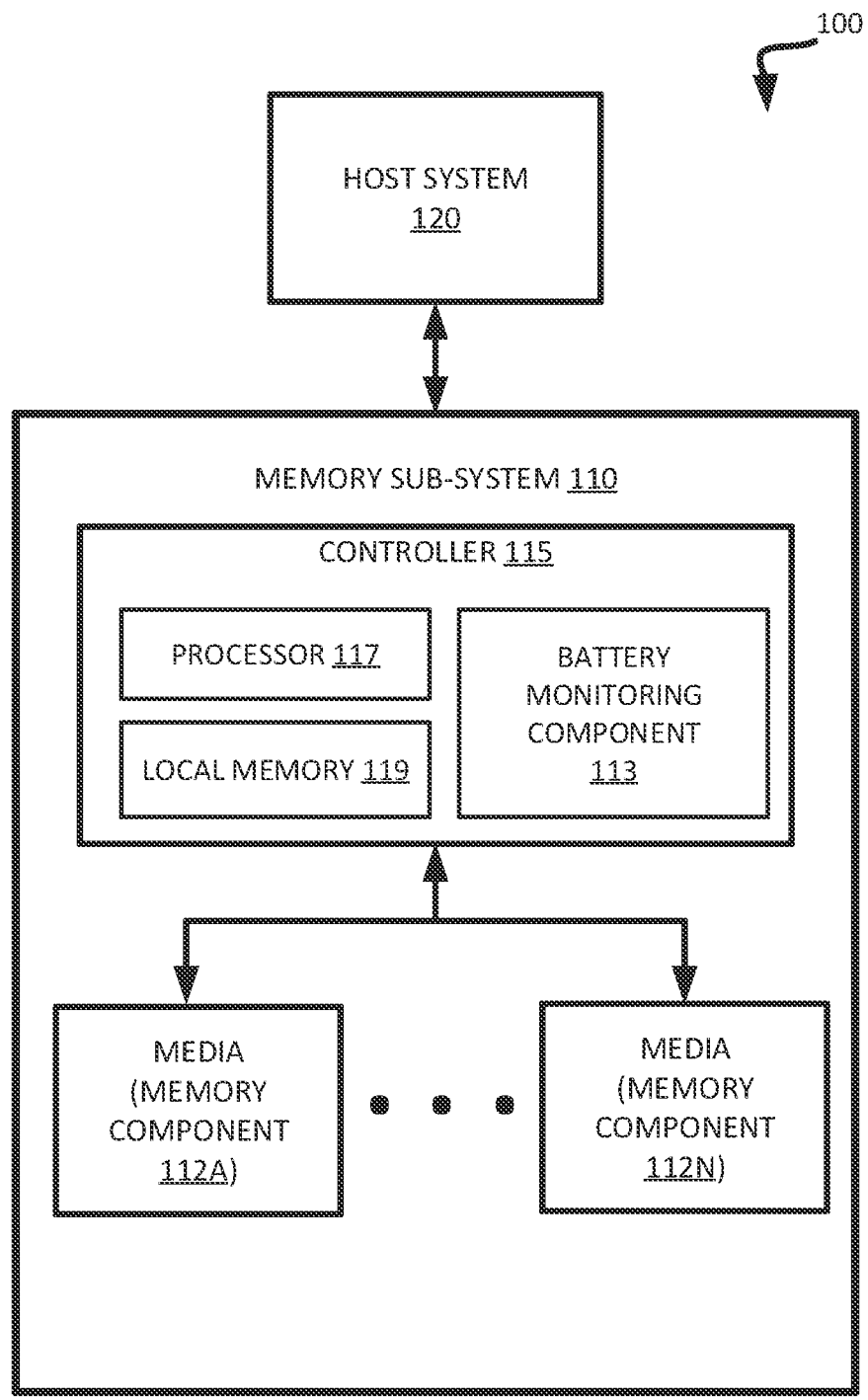
FIG. 1 illustrates an example computing environment that includes a memory sub-system in accordance with some embodiments of the present disclosure.

Aspects of the present disclosure are directed to garbage collection in a memory sub-system including postponing the garbage collection during a low battery state of the memory sub-system. A memory sub-system is also hereinafter referred to as a "memory device." An example of a memory sub-system is a storage device that is coupled to a central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD). Another example of a memory sub-system is a memory module that is coupled to the CPU via a memory bus. Examples of memory modules include a dual in-line memory module (DIMM), a small outline DIMM (SO-DIMM), a non-volatile dual in-line memory module (NVDIMM), etc. In some embodiments, the memory sub-system can be a hybrid memory/storage sub-system. In general, a host system can utilize a memory sub-system that includes one or more memory components. The host system can provide data to be stored at the memory sub-system and can request data to be retrieved from the memory sub-system.

When the host system requests to store data, the data is stored at a physical address within the memory component. The host system provides a logical address identifying the data to be stored. A logical to physical (L2P) mapping table is maintained to identify the physical location where the data corresponding to each logical address resides. A memory component in a memory sub-system can include one or more memory pages (also referred to herein as "pages") for storing one or more bits of binary data corresponding to data received from the host system. One or more memory pages of the memory component can be grouped together to form a data block. When the data is written to the memory component, it is typically done at the page level, such that an entire page, or multiple pages, is written in a single operation. When the host system requests to update data at a particular logical address, the updated data is stored at a new physical location (e.g., a new physical address) and the L2P mapping is updated so that the particular logical address of the data is mapped to the new physical address. The original data (e.g., the data prior to the update) still remains stored in the original physical address. This data, however, is no longer valid from the host's perspective, and is no longer usable by the host. With various changes in data, the memory component accumulates physical addresses across various data blocks that have invalid data, in addition to having physical addresses with valid data. The invalid data stored at the memory component is considered "garbage" and can be cleaned out at some point.

When the memory component is full, such that there is insufficient capacity to accept data from additional write operations, certain data can be erased in order to free up space. When data is erased from the memory component, however, it is typically done at the block level, such that an entire block (including multiple pages) is erased in a single operation. Thus, when a particular segment of data on the memory component is updated, certain pages in a block will have data that has been re-written to a different location and/or is no longer needed. The entire block cannot simply be erased as each block likely also has some number of pages of valid data. A garbage collection ("GC") process can be performed which involves migrating (e.g., rewriting) those pages of the block that contain valid data to another block, so that the current block with both valid and invalid data can be erased. Garbage collection is a form of automatic memory management that attempts to reclaim garbage, or memory occupied by stale data objects that are no longer in use (e.g., because they have been updated with new values). The basic principle of garbage collection is to find data objects that cannot or need not be accessed in the future, and to reclaim the resources (i.e. storage space) used by those objects.

A conventional memory sub-system can include a controller that determines when it is appropriate to initiate a garbage collection operation. The controller can perform calculations to determine an optimum time for performing the GC operation, optimizing for various factors. In some examples, GC is initiated periodically as part of regular memory management operations for the memory sub-system. In other examples, GC is initiated in response to a particular event, such as, receiving a write request (e.g., from the host system) and a determination that memory components have insufficient capacity to accept the write request. In some examples, the controller can determine that the memory component is full and/or there is insufficient capacity to accept any other additional write operations that can be received from the host and that garbage collection needs to be performed to free up space in the memory component. In some examples, the controller can determine that the memory sub-system, or certain components within the memory sub-system, is in an idle state or is experiencing downtime and GC can be performed during this time. Based on the determination of the appropriate time, the controller can initiate the garbage collection operation to erase invalid data from certain blocks.

At times, the controller can determine to perform GC proactively under various circumstances. For example, when the controller determines that GC will be expected to be performed in the near future, the controller can perform GC proactively, instead of waiting until when it is urgent to perform GC at which point it can take a significant amount of time to perform the GC operation. That is, the controller can determine that GC can be performed but performing GC is optional (e.g., system is in idle state). The GC can be performed in small increments and earlier than when it is absolutely necessary. At other times, the controller can determine that GC must be performed, so performing the GC is mandatory (e.g., memory component is full). However, GC can be a power intensive operation. GC can require complex algorithms to optimize for various factors, which may consume significant battery power. If the memory sub-system is already in a low battery state (e.g., battery life remaining in the system is identified as being low, such as, 10% of total battery life), then performing GC during this time can add additional load on battery usage and diminish the remaining battery life earlier than if the GC is not performed.

Aspects of the present disclosure address the above and other deficiencies by monitoring battery state associated with the memory sub-system and postponing garbage collection operation when battery state is identified as being low. In one implementation, a controller in a memory sub-system determines an appropriate time to perform a GC operation by determining that a criterion is satisfied to perform a garbage collection operation on a memory component of the memory sub-system. A determination can be made as to whether the battery state associated with the memory sub-system satisfies a battery condition (e.g., battery life being below a threshold). If the battery condition is satisfied, the controller can continue to monitor the battery state and postpone the GC operation, as needed, until the battery state changes to satisfy another battery condition (e.g., battery life reaches or is above the threshold). If the battery condition is not satisfied (e.g., battery life is not below the threshold), or the battery state changes to satisfy the other battery condition (e.g., battery life being above the threshold), controller can perform the GC operation.

The present disclosure reduces or eliminates the effects of performing garbage collection operation on battery life when the battery life is considered to be already low. Advantages of the present disclosure include, but are not limited to, preserving battery life for performing important and urgent operations, increased performance of the memory sub-system as competing operations are minimized when using limited battery power, not wasting computing resources on performing garbage collection operations that can be delayed, overall performance of the memory sub-system can be improved as other read or write operations can be performed by the memory sub-system instead of performing the garbage collection operation with the limited remaining battery life.

FIG. 1 illustrates an example computing environment 100 that includes a memory sub-system 110 in accordance with some embodiments of the present disclosure. The memory sub-system 110 can include media, such as memory components 112A to 112N. The memory components 112A to 112N can be volatile memory components, non-volatile memory components, or a combination of such. In some embodiments, the memory sub-system is a storage system. An example of a storage system is a SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N.

The memory sub-system 110 includes a battery monitoring component 113 that can be used to store data at a particular memory component based on a corresponding usage threshold. In some embodiments, the controller 115 includes at least a portion of the battery monitoring component 113. For example, the controller 115 can include a processor 117 (processing device) configured to execute instructions stored in local memory 119 for performing the operations described herein. In some embodiments, the battery monitoring component 113 is part of the host system 120, an application, or an operating system.

The battery monitoring component 113 can receive an indication from controller 115 that a criterion to perform a garbage collection operation is satisfied where the garbage collection operation is to be performed on memory components 112A to 112N of the memory sub-system 110. The battery monitoring component 113 can determine that a battery state of a memory sub-system 110 satisfies a first battery condition (e.g., the battery state being below a threshold battery life) and indicate to the controller to postpone the garbage collection operation until the battery state changes to satisfy a second battery condition (e.g., the battery state reaching or going above the threshold battery life). Further details with regards to the operations of the battery monitoring component 113 are described below.

Figure 2:
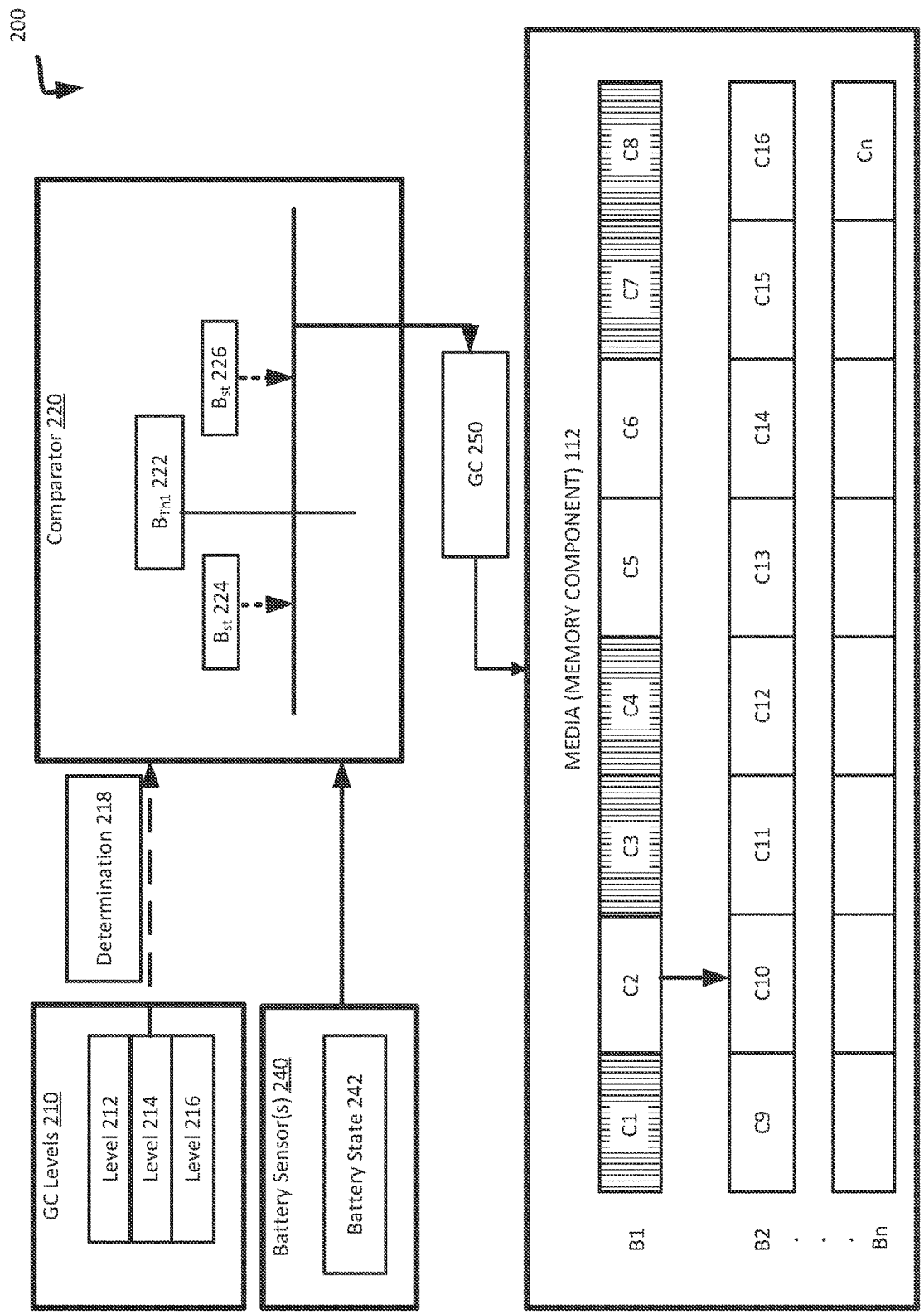
FIG. 2 illustrates an example of postponing garbage collection during a low battery state associated with a memory sub-system in accordance with some embodiments of the present disclosure.

FIG. 2 illustrates an example of postponing garbage collection operation during a low battery state associated with a memory sub-system 200 in accordance with some embodiments of the present disclosure. In general, the memory sub-system 200 can correspond to the memory sub-system 110 of FIG. 1. For example, the memory sub-system 200 can include battery monitoring component 113 of FIG. 1. In some embodiments, the battery monitoring component 113 can be configured to monitor a battery state associated with the memory sub-system 200 and to determine whether to perform or postpone a garbage collection operation based on the battery state associated with memory sub-system 200.

Controller 115 can set various garbage collection levels 210. The garbage collection levels can indicate the level of necessity to perform the GC operation. In one example, the level of necessity can be determined by factors, such as, amount of invalid data on the data block. For example, level 212 can indicate that garbage collection is not necessary; level 214 can indicate that garbage collection can be performed proactively (e.g., optionally) but it is not mandatory (e.g., not urgent); and level 216 can indicate that performing garbage collection is mandatory (e.g., urgent). Controller 115 can perform calculations to determine an optimum time for performing the GC operation based on policies set in controller 115, optimizing for various factors (e.g., sequential write, dirty condition, etc.). Based on the calculations, controller 115 can determine whether one of the garbage collection levels 210 is satisfied.

In one example, controller 115 can make the determination for an optimum time for performing the GC operation based on capacity to accept additional write operations from host 120. As shown in the example of FIG. 2, memory component 112 can include a number of memory cells (e.g., C1 to Cn). Each of the memory cells can store one or more bits of binary data corresponding to data received from the host system 120. Separate data blocks (e.g., B1, B2, Bn, etc.) in the memory component 112 can be formed by grouping the memory cells together. In an example, controller 115 can determine that memory component 112 is in a clean condition, that is, the level of invalid data across various data blocks B1 through Bn is below a threshold set for performing GC operations. In that situation, controller 115 can determine that that a GC operation is not necessary, and that level 212 is satisfied. If level 212 is satisfied, the controller 115 does not perform GC.

In an example, such as that shown in FIG. 2, memory cells C1, C3, C4, C7, and C8 of data block B1 contain invalid data and memory cells C2, C5, and C6 of data block B1 contain valid data. Controller 115 can determine that data block B1 will be too "dirty" (e.g., contain too much invalid data) in the near future, or after some of the cells C2, C5, and C6 contain invalid data. In conjunction with assessing capacity of other data blocks B2 through Bn, controller 115 can determine that memory component 112 is becoming full such that there will be insufficient capacity for accepting write operations from host 120 within a predetermined time frame or a number of operations in the future. In this situation, controller 115 can determine that a garbage collection operation can be initiated proactively (e.g., optionally) to clean up the memory component 112, instead of waiting until when the memory component 112 is in too dirty condition. Controller 115 can determine that level 214 is satisfied, that is, GC can be performed proactively (e.g., optionally) but it is not mandatory (e.g., not urgent) to perform the GC operation. In an example, GC level 214 indicates that the amount of invalid data on the data block is at a level where the GC operation can be optionally performed. As a result, controller 115 determines that a criterion to perform the GC operation is satisfied. Controller 115 performs the GC operation by writing data from memory cells C1, C3, C4, C7, and C8 of data block B1 to memory cells in one or more other data blocks, and erasing the data from data block B1 to reclaim the memory space.

In one implementation, battery monitoring component 113 can receive an indication from controller 115 that a criterion to perform a garbage collection operation is satisfied in response to garbage collection level 214 being satisfied. That is, the controller 115 can determine that the GC operation can be performed proactively but it is not mandatory (e.g., urgent) to perform the GC operation.

Upon receiving indication that the criterion to perform a garbage collection operation is satisfied, battery monitoring component 113 can determine whether a battery state associated with the memory sub-system 200 satisfies a first battery condition. In some examples, the battery state can indicate the remaining battery life associated with the memory sub-system 200 at a certain point in time. In an example, the battery state can indicate there is 30% battery life remaining out of a total of 100% battery life. In some other examples, the battery state can indicate the memory sub-system is associated with low battery, average battery, high battery, full battery, etc.

Battery state associated with the memory component 112 can be obtained in various ways. In one example, the battery state can include a battery state 242 obtained from one or more battery sensors 240 within computing environment 100. In another example, controller 115 can provide battery state 242. In yet another example, host 120 can provide battery state 242. In some examples, a signal from one of the components associated with the memory sub-system 200 can indicate battery state 242. In some implementations, battery state 242 can be obtained periodically and at pre-defined intervals and be provided to battery monitoring component 113. In other implementations, the battery sensors 240 can provide the battery state 242 responsive to one or more commands or queries, such as a particular command by battery monitoring component 113 to obtain battery state 242.

Battery monitoring component 113 can perform a battery comparison operation using a comparator 220 to determine whether the battery state associated with the memory sub-system 200 satisfies a battery condition. In an example, a battery condition can be defined as the battery state being below, equal to, or above a threshold battery life. As shown in FIG. 2, the memory sub-system 200 can specify one or more threshold battery lives, a first threshold battery life $B_{Th1}$ 222 and/or a second threshold battery $B_{Th2}$ 223. In another example, a battery condition can be defined as the battery state being low battery, not low battery, full battery, etc.

In an implementation, comparator 220 can determine whether the battery state associated with memory sub-system 200 satisfies a first battery condition. In an example, the first battery condition can be defined as the battery state being below the first threshold battery life $B_{Th1}$ 222 (e.g., 15% of total battery life) as specified in the memory sub-system 200. FIG. 2 shows a battery state $B_{st}$ 224 (e.g., 14% of total battery life) at one point in time. Comparator 220 can compare the first threshold battery life $B_{Th1}$ 222 and the battery state $B_{st}$ 224. The comparator 220 can determine that the battery state $B_{st}$ 224 is below the first threshold battery life $B_{Th1}$ 222. In another example, the first battery condition can be defined as the battery state being low battery.

If it is determined that battery state $B_{st}$ 224 satisfies the first battery condition, controller 115 can postpone the GC operation. The GC operation can be postponed despite the determination that the criterion to perform the GC operation is satisfied. In one example, controller 115 can postpone the GC operation by not performing the GC operation. In another example, postponing the GC operation can be achieved by continuing to monitor the battery state to detect changes in the battery state without performing the GC operation. By excluding performance of the power intensive GC operation when battery state is determined as being below the threshold, or as being low battery, the remaining limited battery life can be preserved for performing other urgent operations and/or to extend the battery life for longer period than if GC was to be performed.

In some embodiments, controller 115 can postpone the GC operation until the battery state changes to satisfy a second battery condition. The comparator 220 can determine that the battery state has changed to satisfy the second battery condition. In an example, the second battery condition can be defined as the battery state being equal to or above the first threshold battery life $B_{Th1}$ 222 (e.g., 15% of total battery life) as specified in the memory sub-system 200. In one example, after continuing to monitor the battery state, the battery state can change to go further below the first threshold battery life $B_{Th1}$ 222 than the battery state $B_{st}$ 224 previously obtained. In this case, the second battery condition is not satisfied and battery monitoring component 113 can continue to monitor the battery state. In another example, the battery state can change to reach or surpass the first threshold battery life $B_{Th1}$ 222 to be $B_{st}$ 226. In this case, battery state $B_{st}$ 226 satisfies the second battery condition of being equal to or above the first threshold battery life. The comparator 220 can determine that $B_{st}$ 226 is equal to or above the first threshold battery life $B_{Th1}$ 222. In another example, the second battery condition can be defined as the battery state being above a second threshold battery life $B_{Th2}$ 223 (e.g., 20% of total battery life) (not shown) that is different from the first threshold battery life $B_{Th1}$ 222. In such examples, a difference between the first and the second threshold battery life can be used to make certain that performing GC operation does not immediately bring the battery state to be in a low battery state. In some examples, the second battery condition can be defined as the battery state being not low battery, or being one of average battery, high battery, or full battery. Upon battery monitoring component 113 determining that the battery state changed to satisfy the second battery condition, controller 115 can perform the GC operation. By performing the GC operation 250 after battery state changes to be equal to or above the threshold battery life, the power intensive GC operation is performed when there is adequate battery life to support the operation.

In some examples, upon receiving indication that the criterion to perform a garbage collection operation is satisfied, battery monitoring component 113 can determine that the battery state does not satisfy the first battery condition. That is, comparator 220 can determine that battery state $B_{st}$ 226 is equal to or above the first threshold battery $B_{Th1}$ 222. In that situation, controller 115 performs the GC operation 250. For example, controller 115 performs the GC operation by migrating data from memory cell C2, C5, and C6 of data block B1 to memory cells in other data block(s), such as data block B2.

In some examples (not shown), controller 115 can determine that memory component 112 is too dirty, and cannot accept additional write operations from host 120, thus determine that level 216 is satisfied (e.g., GC is mandatory). That is, GC level 216 can indicate that the amount of invalid data on the data block is at a level where the GC operation must be performed. In one example, this determination can be made before determining that the battery state satisfies a first battery condition (e.g., low battery, below threshold battery life, etc.), or after determining that the battery state satisfies the first battery condition but prior to the battery state changing to satisfy the second battery condition (e.g., not low battery). Upon determining that level 216 is satisfied, that is, GC operation is urgent, controller 115 determines that a criterion to perform the GC operation is satisfied.

In some implementation, if level 216 is satisfied (e.g., GC is urgent), then even if battery state indicates low batter life, controller 115 performs the GC operation. Controller 115 performs the GC operation regardless of battery state in order to accept additional host write operations without a failure. In other implementations, battery monitoring component 113 can consider various factors to determine whether the GC operation that is indicated as urgent is to be performed when battery state indicates low battery life. For example, the factors can include, but are not limited to, level of importance of continuing other operations that are being performed at the time and whether those operations have to be suspended, whether failure to accept write operation is indicated as being more or less important than preserving battery life, other factors assessing importance of battery life preservation against garbage collection, etc. Based on the factors, in one example, battery monitoring component 113 can indicate to the controller 115 to postpone the GC operation despite level 216 being satisfied.

Figure 3:
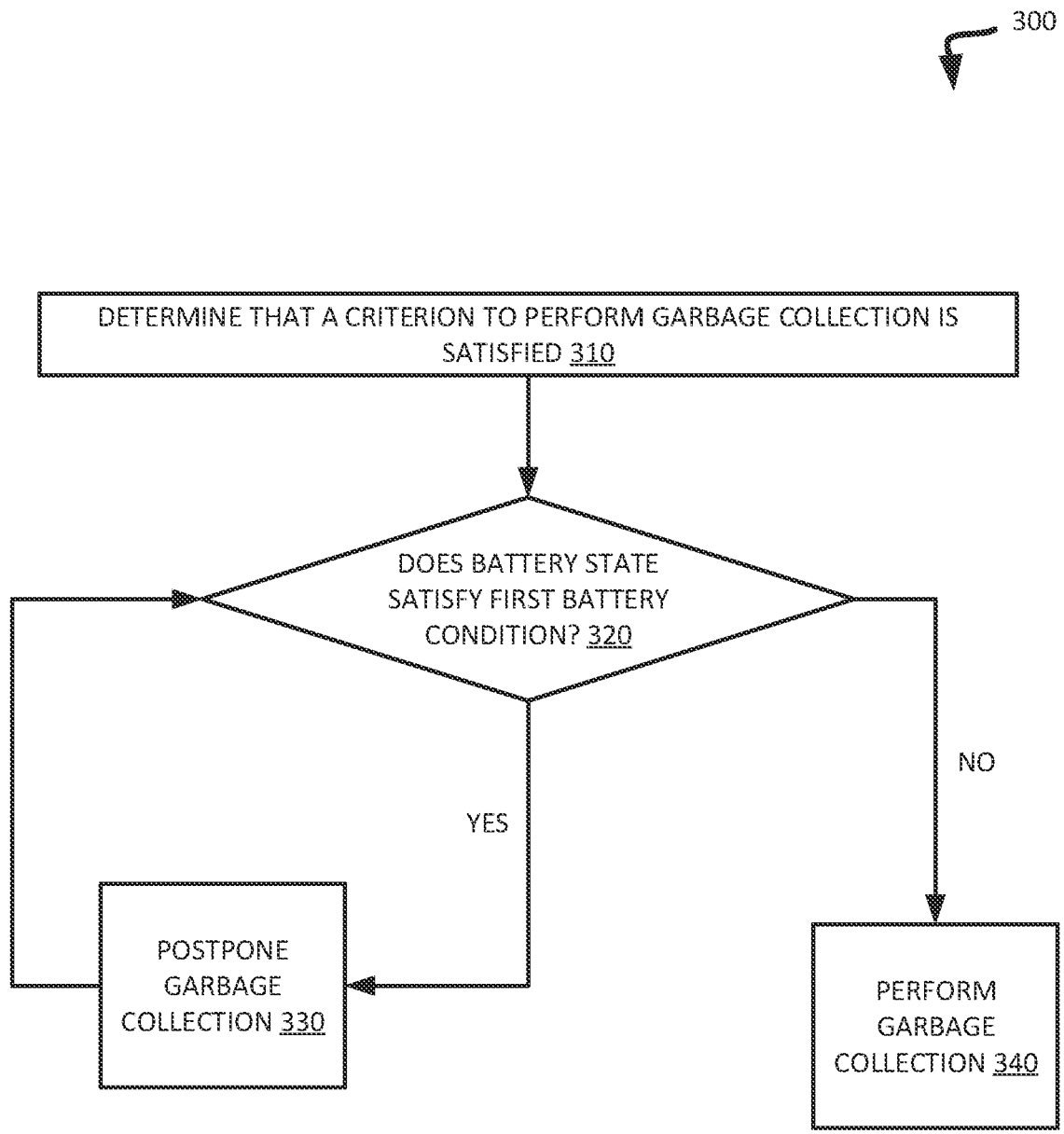
FIG. 3 is a flow diagram of an example method to postpone garbage collection during a low battery state associated with a memory sub-system in accordance with some embodiments of the present disclosure.

FIG. 3 is a flow diagram of an example method 300 to postpone garbage collection during a low battery state associated with a memory sub-system, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the battery monitoring component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic determines that a criterion to perform a garbage collection operation is satisfied. In an implementation, the processing logic can determine that the criterion to perform GC operation is satisfied in response to determining that a first garbage collection level to perform the garbage collection operation is satisfied. In an example, the first garbage collection level indicates that the garbage collection operation can be performed proactively (e.g., GC can be performed but not urgent to be performed).

At operation 320, the processing logic determines whether a battery state associated with the memory sub-system satisfies a first battery condition. In an example, the first battery condition is satisfied when the battery state is below a first threshold battery life. In another example, the first battery condition is satisfied when the battery state indicates low battery life.

If the battery state satisfies the first battery condition, at operation 330, the processing logic postpones the garbage collection operation until the battery state changes to satisfy a second battery condition. The GC operation can be postponed despite the criterion to perform GC operation being satisfied. In one example, the processing logic can postpone the GC operation by not performing the GC operation. In an example, the battery state satisfies the second battery condition when the battery state changes to be equal to or above a second threshold battery life. In some examples, the second threshold battery life is the same as the first threshold battery life. In other examples, the second threshold battery life is different from the first threshold battery life.

If the battery state does not satisfy the first battery condition, at operation 340, the processing logic performs the garbage collection operation. For example, battery state Bst 226 can indicate that memory sub-system 200 is not associated with low battery, or is not below the first threshold battery life $B_{TH1}$ 222 at a certain point in time. In another example, even if battery state initially satisfied the first battery condition (e.g., battery state was below the threshold at one point), the processing logic can determine that the battery state changed to satisfy the second battery condition (e.g., battery state equal to or above the threshold condition). In such scenarios, processing logic performs the GC operation 250.

The processing logic can further determine that a second garbage collection level to perform the garbage collection operation is satisfied prior to the battery state changing to satisfy the second battery condition. For example, the second garbage collection level indicates that performing the garbage collection operation is mandatory (e.g., "urgent"). Responsive to the second garbage collection condition level being satisfied, the processing logic can perform the garbage collection operation.

Figure 4:
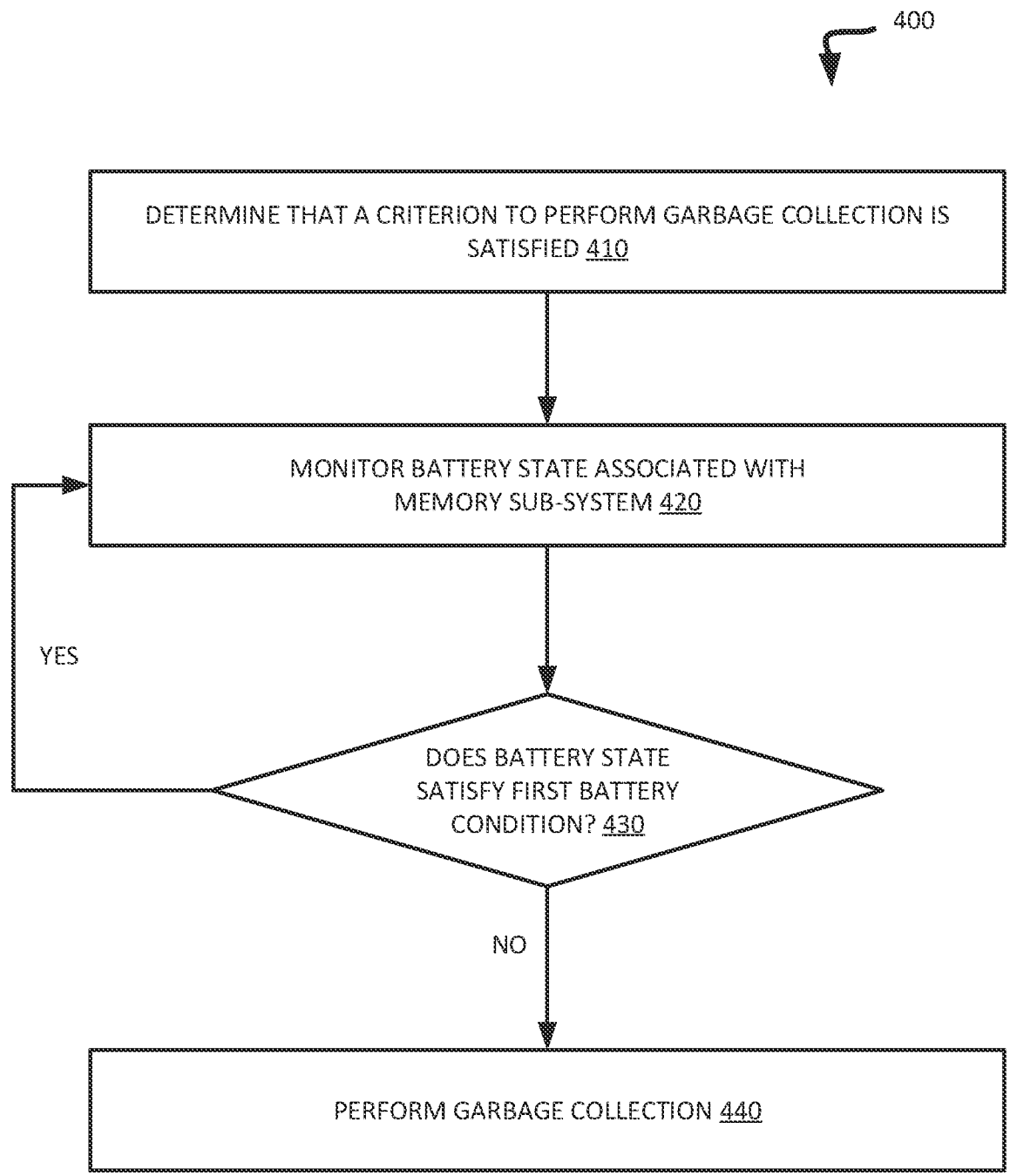
FIG. 4 is a flow diagram of an example method to monitor battery condition associated with a memory sub-system for performing garbage collection in accordance with some embodiments of the present disclosure.

FIG. 4 is a flow diagram of an example method 400 to monitor battery condition associated with a memory sub-system for performing garbage collection, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the battery monitoring component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic determines that a criterion to perform a garbage collection operation is satisfied. In an implementation, processing logic can determine that the criterion to perform GC operation is satisfied in response to determining that a first GC level to perform the garbage collection operation is satisfied. In an example, the first GC level indicates that the garbage collection operation can be performed proactively (e.g., optional but not urgent).

At operation 420, the processing logic monitors a battery state associated with the memory sub-system. In some examples, the battery state can indicate the remaining battery life associated with the memory sub-system 200 at a certain point in time. In some other examples, the battery state can indicate the memory sub-system is associated with low battery, average battery, high battery, full battery, etc. at a certain time.

At operation 430, the processing logic determines whether the battery state satisfies a first battery condition. In an example, the first battery condition is satisfied when the battery state is below a first threshold battery life. In another example, the first battery condition is satisfied when the battery state indicates low battery life.

If the battery state satisfies the first battery condition, the processing logic repeats operation 420 to continue to monitor the battery state to detect changes in the battery state satisfying a second battery condition. In an example, the second battery condition is satisfied when the battery state is equal to or above a second threshold battery life. In some embodiments, the first threshold battery life is same as the second threshold battery life, and in other embodiments, the first threshold battery life is different from the second threshold battery life. In another example, the second battery condition is satisfied when the battery state does not indicate low battery life. In an example, the processing logic can continue to monitor the battery state without performing the GC operation. By continuing to monitor the battery state without performing the GC until the second battery condition is satisfied, the processing logic postpones the GC operation until the second battery condition is satisfied.

If the battery state does not satisfy the first battery condition (e.g., remaining battery life is not low), at operation 440, the processing logic performs the GC operation. In one example, battery state Bst 226 can indicate that memory sub-system 200 is not associated with low battery, or is not below the first threshold battery life $B_{TH1}$ 222 at a certain point in time. In another example, even if battery state initially satisfied the first battery condition (e.g., low battery state at one point), the processing logic can determine that the battery state changed to satisfy the second battery condition (e.g., battery state equal to or above the threshold condition). In such scenarios, processing logic performs the GC operation 250.

Figure 5:
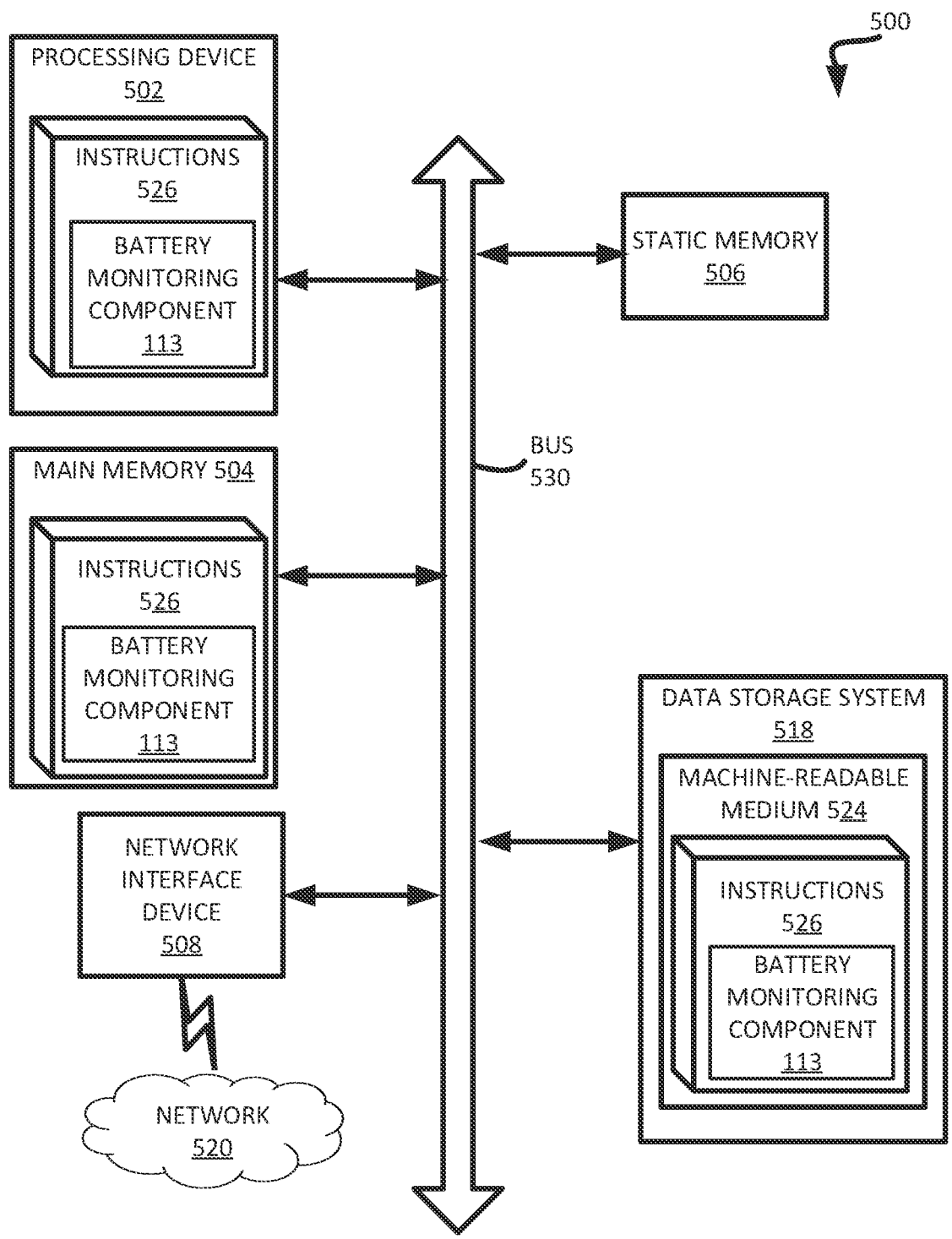
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the battery monitoring component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to an error control component (e.g., the battery monitoring component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a physical interface configured to be coupled to a memory device of a memory sub-system; and
a processing device coupled with the physical interface and configured to:
determine that an amount of invalid data of a first block stored on the memory device satisfies a threshold level for attempting to perform a garbage collection operation for the first block, the garbage collection operation for the first block comprising a migration of one or more pages of the first block that contain valid data to a second block stored on the memory device;
determine a battery life state of a battery associated with the memory sub-system;
postpone the garbage collection operation for the first block based at least in part on a determination that the battery life state is below a first battery life threshold;
determine whether the battery life state changes to be equal to or above a second battery life threshold; and
perform the garbage collection operation for the first block based at least in part on a determination that the battery life state changes to be equal to or above the second battery life threshold.

2. The system of claim 1, wherein the threshold level corresponds to a threshold amount of data that indicates that the garbage collection operation can be optionally performed for the first block.

3. The system of claim 1, wherein the first battery life threshold is equal to the second battery life threshold.

4. The system of claim 1, wherein the first battery life threshold is different from the second battery life threshold.

5. The system of claim 1, wherein the processing device is further configured to continue postponing the garbage collection operation for the first block based at least in part on a determination that the battery life state is below the second battery life threshold.

6. The system of claim 1, wherein the processing device is further configured to perform the garbage collection operation for the first block based on a determination that the amount of invalid data on the first block satisfies a second threshold level, and wherein the second threshold level corresponds to a threshold amount of data that indicates that the garbage collection operation for the first block must be performed.

7. A method comprising:
   determining, by a processing device, that an amount of invalid data on a first block stored on a memory device of a memory sub-system satisfies a threshold level for attempting to perform a garbage collection operation for the first block, the garbage collection operation for the first block comprising a migration of one or more pages of the first block that contain valid data to a second block stored on the memory device;
   determining, by the processing device, a battery life state of a battery associated with the memory sub-system;
   postponing, by the processing device, the garbage collection operation for the first block based at least in part on a determination that the battery life state is below a first battery life threshold;
   determining, by the processing device, whether the battery life state changes to be equal to or above a second battery life threshold; and
   performing, by the processing device, the garbage collection operation for the first block based at least in part on a determination that the battery life state is equal to or above the second battery life threshold.

8. The method of claim 7, wherein the threshold level corresponds to a threshold amount of data that indicates that the garbage collection operation can be optionally performed for the first block.

9. The method of claim 7, further comprising continuing, by the processing device, postponing the garbage collection operation for the first block based at least in part on a determination that the battery life state is below the second battery life threshold.

10. The method of claim 7, wherein the garbage collection operation for the first block is further performed based on a determination that the amount of invalid data on the first block satisfies a second threshold level, and wherein the second threshold level corresponds to a threshold amount of data that indicates that the garbage collection operation for the first block must be performed.

11. The method of claim 7, wherein the first battery life threshold is equal to the second battery life threshold.

12. The method of claim 7, wherein the first battery life threshold is different from the second battery life threshold.

13. A non-transitory computer-readable storage medium comprising instructions that, when executed by a processing device, cause the processing device to:
   determine that an amount of invalid data of a first block stored on a memory device of a memory sub-system satisfies a threshold level for attempting to perform a garbage collection operation for the first block, the garbage collection operation for the first block comprising a migration of one or more pages of the first block that contain valid data to a second block stored on the memory device;
   determine a battery life state of a battery associated with the memory sub-system;
   postpone the garbage collection operation for the first block based at least in part on a determination that the battery life state is below a first battery life threshold;
   determine whether the battery life state changes to be equal to or above a second battery life threshold; and
   perform the garbage collection operation for the first block based at least in part on a determination that the battery life state is equal to or above the second battery life threshold.

14. The non-transitory computer-readable storage medium of claim 13, wherein the threshold level corresponds to a threshold amount of data that indicates that the garbage collection operation can be optionally performed for the first block.

15. The non-transitory computer-readable storage medium of claim 13, wherein the processing device is further configured to continue postponing the garbage collection operation for the first block based at least in part on a determination that the battery life state is below the second battery life threshold.

16. The non-transitory computer-readable storage medium of claim 13, wherein the processing device is further configured to perform the garbage collection operation for the first block based on a determination that the amount of invalid data on the first block satisfies a second threshold level, and wherein the second threshold level corresponds to a threshold amount of data that indicates that the garbage collection operation for the first block must be performed.

17. The non-transitory computer-readable storage medium of claim 13, wherein the first battery life threshold is equal to the second battery life threshold.

18. The non-transitory computer-readable storage medium of claim 13, wherein the first battery life threshold is different from the second battery life threshold.

* * * * *